UNITED STATES PATENT OFFICE.

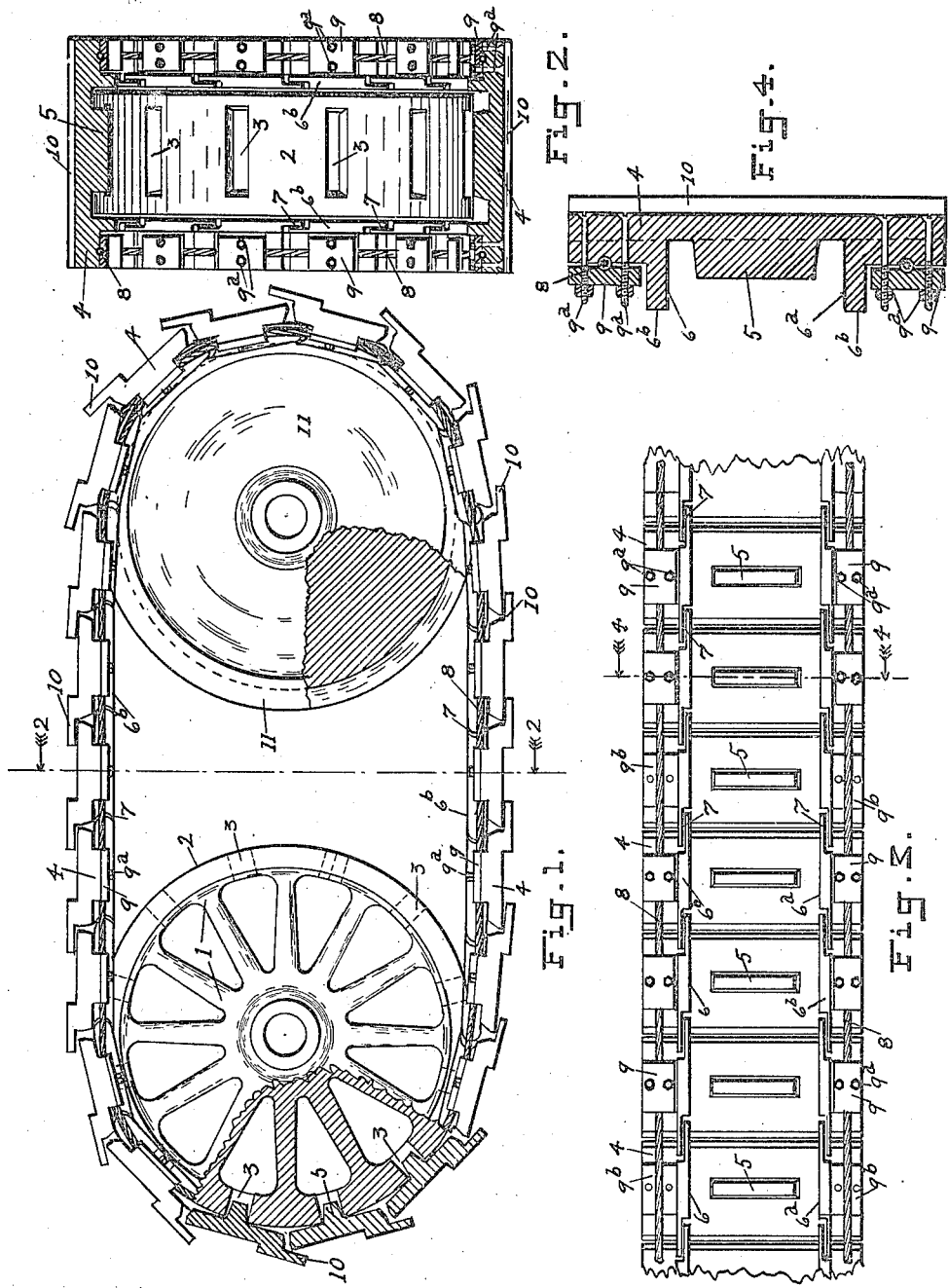

JOHN HAY, OF SAN JOSE, CALIFORNIA.

FLEXIBLE TRACTOR-TRACK AND OPERATIVE WHEEL THEREFOR.

1,282,827.      Specification of Letters Patent.      Patented Oct. 29, 1918.

Application filed July 1, 1918. Serial No. 242,850.

*To all whom it may concern:*

Be it known that I, JOHN HAY, a subject of Great Britain, residing at San Jose, in the county of Santa Clara and State of California, have invented a new and useful Improvement in Flexible Tractor-Tracks and Operative Wheels Therefor, of which the following is a specification.

This invention relates to improvements in flexible tracks and operative wheel therefor, as used on tractors of the track laying or caterpillar type and the like and the objects of my invention are:

First; to provide a flexible track for tractors that will have no pivoted joints or links and one in which the number of moving parts are reduced to a minimum.

Second; to provide a flexible track for tractors and operative wheel therefor in which the cost of manufacture and the upkeep is greatly reduced as compared to those of this class now in use.

Third; to provide a flexible track for tractors in which the tread members and guide rails of each member are integral and one in which the several tread members are fastened together by flexible wire cables.

Fourth; to provide a flexible track for tractors in which the adjustment of the several parts and the removal of worn parts may be accomplished with a minimum amount of labor, and one in which no lubrication of the several parts is needed.

A further object is to generally improve this class of flexible tractor tracks and operative wheel therefor so as to increase their usefulness, durability and efficiency.

With these and other objects in view the invention resides in certain novel features of construction and in the unique combination of parts to be hereinafter fully described and claimed, it being understood that various changes in form, proportion, and minor details of construction may be resorted to within the scope of the appended claims.

Reference is to be had to the accompanying drawing, forming a part of this specification in which similar reference characters indicate corresponding parts in all the views.

Figure 1 is a side view of my flexible tractor track and operative wheel therefor, part in section, parts broken away.

Fig. 2 is a sectional view as shown on line 2—2 of Fig. 1.

Fig. 3 is a plan view of the flexible track, parts broken away.

Fig. 4 is an enlarged sectional view as shown on line 4—4 of Fig. 3.

My improvement in flexible tractor track and operative wheel therefor, forming the subject matter of the present invention, comprises an operative wheel 1 made of cast iron or other suitable material and having a substantially flat tire or outer rim 2. Equally spaced apart around the outer periphery of the rim 2 are shown a plurality of openings or slots 3 which pass completely through the rim 2. The operative wheel 1 may be power driven by any suitable power operative means, not shown. Each tread member 4 of the flexible track has a boss or tooth 5 integral with the tread member, adapted to engage the slots 3 of the operative wheel 1. Transverse guide rails also integral with the tread member are shown at 6—6$^a$, forming a track 6$^b$, over which rollers may roll, the guide rails of one tread member overlapping the guide rails of an adjacent tread member, as shown at 7. A plurality of continuous flexible cables are shown at 8 and are fastened to each tread member, at each end thereof by means of clamps 9 and bolts 9$^a$. The treads with the clamp 9 removed are shown at 9$^b$. A plurality of the tread members being thus fastened to the flexible cables form a continuous flexible belt, the guide rails forming a track adapted to receive rollers thereon of any suitable type, each tread member being so placed that the boss or tooth of each member engages a slot in the operative wheel. The lower tread surface of each tread member has an overlapping flange 10 integral with the tread member and which overlaps the joint between adjacent tread members. An idler wheel is shown at 11 which may be mounted on suitable adjustable bearings and is adapted to guide the endless flexible track in its return to the operative wheel. It will be readily seen from the foregoing description that I have eliminated all pivot joints in the flexible track and also that any tread member may be readily removed and a new one set in place without disturbing adjacent tread members, or the adjustment of the mechanism.

The operation of my flexible tractor track and operative wheel therefor is as follows:

When the operative wheel 1 is revolved by any suitable means, the bosses 5 engage the slots 3 thereby pulling the flexible track over the operative wheel and idler wheel 11, the bosses and slots preventing slipping. The sides of the rim of the operative wheel and idler wheel pass between the guide rails 6—6ª thereby holding the flexible track in place, the guide rails forming a track over which rollers may roll. The flexibility of the cables allows the track to take the curvature of the wheels over which it passes. The flexible cable furnishes means for holding the several tread members in proper relation to each other and to cause the boss of each tread member to register with the slots in the operative wheel, no lubrication of the parts required.

Having thus described my invention what I claim as new and desire to secure by Letters Patent is:

1. A flexible tractor track and operative wheel therefor comprising a wheel made of cast iron or other suitable material and having a substantially flat rim or tire, said rim or tire having a plurality of rectangular shaped openings equally spaced apart around the outer periphery thereof, said openings communicating with the inner periphery of said rim or tire, and positioned between the spokes of said wheel; a plurality of tread members; a plurality of flexible cables; means for clamping each tread member to the cables, thereby forming a belt or chain; a boss or tooth integral with each tread member, adapted to engage the openings in the rim or tire of said wheel as the belt or chain composed of the tread members and cables fastened together is flexed over said wheel; transverse guide rails positioned a distance from each end of the tread members and integral therewith, the guide rails of one tread member overlapping the guide rails of an adjacent tread member, said guide rails being adapted to guide the tread and boss into engagement with the wheel, rim and openings therein, and to serve as tracks over which rollers may roll, substantially as shown and described.

2. In a flexible tractor track and operative wheel therefor, the combination of a wheel made of cast iron or other suitable material and having a substantially flat rim or tire, said rim or tire being provided with a plurality of openings or slots equally spaced apart around the outer periphery thereof, said openings or slots extending through said rim or tire and positioned between the spokes of said wheel; a plurality of tread members; a plurality of flexible cables, adapted to be clamped to the tread members; means for clamping each tread member to the cables; a boss or tooth integral with each tread member and positioned on the upper side thereof, said boss or tooth of each tread member being adapted to engage a slot or opening in the rim or tire of the wheel; transverse guide rails positioned on the upper side of the tread members, a distance from each end thereof and integral therewith, the guide rails of one tread member overlapping the guide rails of an adjacent tread member, said guide rails being adapted to guide the treads and bosses into engagement with the wheel rim and slots or openings therein, and to serve as tracks over which rollers may roll, substantially as shown and described.

In testimony whereof I have hereunto set my hand in presence of two subscribing witnesses.

JOHN HAY.

Witnesses:
O. M. VROOMAN,
COLIN KYLE.

Copies of this patent may be obtained for five cents each, by addressing the "Commissioner of Patents, Washington, D. C."